US012667121B2

(12) United States Patent
Calabuig Pons et al.

(10) Patent No.: US 12,667,121 B2
(45) Date of Patent: Jun. 30, 2026

(54) USE OF MANNOSE OLIGOSACCHARIDE COMPOSITIONS FOR FEEDING CRUSTACEANS

(71) Applicant: CARGILL, INCORPORATED, Wayzata, MN (US)

(72) Inventors: Virginia Calabuig Pons, Vilvoorde (BE); Bruno Frederic Stengel, Brussels (BE)

(73) Assignee: CARGILL, INCORPORATED, Wayzata, MN (US)

( * ) Notice: Subject to any disclaimer, the term of this patent is extended or adjusted under 35 U.S.C. 154(b) by 634 days.

(21) Appl. No.: 17/999,703

(22) PCT Filed: May 28, 2021

(86) PCT No.: PCT/US2021/034756
§ 371 (c)(1),
(2) Date: Nov. 22, 2022

(87) PCT Pub. No.: WO2021/243151
PCT Pub. Date: Dec. 2, 2021

(65) Prior Publication Data
US 2023/0309579 A1      Oct. 5, 2023

(30) Foreign Application Priority Data

May 29, 2020      (EP) .................................... 20177491

(51) Int. Cl.
A23K 20/163      (2016.01)
A23K 50/80      (2016.01)
A23L 17/40      (2016.01)

(52) U.S. Cl.
CPC ............ A23K 20/163 (2016.05); A23K 50/80 (2016.05); A23L 17/40 (2016.08)

(58) Field of Classification Search
CPC ....... A23K 20/163; A23K 50/80; A23L 17/40; Y02A 40/818
See application file for complete search history.

(56) References Cited

U.S. PATENT DOCUMENTS

2010/0130634 A1*   5/2010   Fritsch ............... C08G 65/4006
521/189

FOREIGN PATENT DOCUMENTS

| CN | 104970229 A | | 10/2015 |
|----|-------------|---|---------|
| CN | 105287453 B | * | 9/2019 |
| CN | 110753550 A | | 2/2020 |
| WO | 2018232078 A1 | | 12/2018 |

OTHER PUBLICATIONS

Do-Huu Hoang, "Influence of dietary B-glucan on length-weight relationship, condition factor and relative weight of pompano fish (*Trachinotus ovatus*, family carangidea)", International Journal of Fisheries and Aquatic Studies 2020; 8 (2): 85-91.

Eun-Ho Song et al., "Synthesis of Multivalent Tuberculosis and Leishmania-Associated Capping Carbohydrates Reveals Structure-Dependent Responses Allowing Immune Evasion", J. Am. Chem. Soc. 2010, 132, 11428-11430.

Jian Zhang et al., "Effects of Dietary mannan oligosaccharide on growth performance, gut morphology and stress tolerance of juvenile Pacific white shrimp, *Litopenaeus vannamei*", Fish & Shellfish Immunology 33 (2012) 1027-1032.

Kaoru Takegawa et al., "Effect of Deglycosylation of Polymannose Chains on the Properties of Yeast External Invertase", Journal of Fermentation and Bioengineering vol. 70, No. 2, 131-133, 1990.

Nowena S. Solidum et al., (Immune responses and resistance to vibriosis of juvenile Pacific whiteleg shrimp *Penaeus vannamei* fed with high dose mannan oligosaccharide and B-glucan, AACL Bioflux, 2016, vol. 9, Issue 2, 239-249.

Serafin Valverde et al., "A combined intramolecular-intermolecular one-pot glycosylation approach for the synthesis of a branched trisaccharide", Chem. Commun., 2000, 813-814.

Widanarni et al., Dietary Mannan Oligosaccharides Positively Affect the Growth, Digestive Enzyme Activity, Immunity and Resistance against Vibrio harveyi of Pacific White Shrimp (*Litopenaeus vannamei*) Larvae, Turk. J. Fish. & Aquat. Sci. 19(4), 271-2798 (2018).

* cited by examiner

*Primary Examiner* — Erik Kashnikow
*Assistant Examiner* — Janice Y Silverman

(57)      ABSTRACT

The present invention relates to a feed composition suitable for feeding crustaceans comprising mannose oligosaccharides. The invention also relates to the use of mannose oligosaccharide compositions for feeding crustaceans. The invention also relates to crustaceans as a food source, in particular shrimp of the species *Litopenaeus vannamei* or *Penaeus monodon*, fed with the feed composition comprising mannose oligosaccharides.

13 Claims, No Drawings

USE OF MANNOSE OLIGOSACCHARIDE COMPOSITIONS FOR FEEDING CRUSTACEANS

CROSS-REFERENCE TO RELATED APPLICATIONS

This application is a national phase of International Application No. PCT/US2021/034756, filed May 28, 2021, which claims the benefit of European Application No. 20177491.6, filed May 29, 2020, each of which is incorporated by reference herein in its entirety.

FIELD OF THE INVENTION

The present invention relates to a novel feed composition suitable for feeding crustaceans comprising mannose oligosaccharides, preferably of the order Decapoda, more preferably of the suborders Dendrobranchiata and Pleocyemata, most preferably shrimp of the species *Litopenaeus vannamei* (formerly also known as *Penaeus vannamei*) and *Penaeus monodon*. The invention also relates to the use of a mannose oligosaccharide composition for feeding crustaceans, preferably of the order Decapoda, more preferably of the suborders Dendrobranchiata and Pleocyemata, most preferably shrimp of the species x *vannamei* and *Penaeus monodon*. The present invention further relates to said use for the purposes of decreasing the food conversion ratio, decreasing the mortality rate, increasing the growth performance, increasing the gastrointestinal tract or muscular layer thickness, more specifically midgut epithelium and brusborder height, as measured by histology, and increasing the survival rate in case of bacterial infection of the crustaceans.

BACKGROUND OF THE INVENTION

There is an existing demand for nutritional supplements for improving overall health in aquaculture, in particular in the farming of crustaceans, such as shrimp, prawn, crab, lobster (including langoustine), crayfish (or also known as crawfish).

With world population increasing, the demand for animal proteins for human consumption is ever growing. Farmed crustaceans form a significant component of current growth in the aquaculture sector and in the future are expected to result in a higher relative contribution to overall aquatic protein production. A rapid increase in global crustacean production in the last two decades largely reflects the dramatic increase in white leg shrimp (*Litopenaeus vannamei*) culture in Asia, notably in China, Thailand and Indonesia. The culture of *Litopenaeus vannamei* has attracted producers due to a number of competitive advantages in terms of the following parameters: faster growth rate, safe high stocking density, low salinity tolerance, cool temperature tolerance, protein requirements (less feed protein) and possibility of breeding and domestication and less disease compared to *Penaeus monodon*.

However, the seafood industry is facing challenges to breed more animals. Methods include increasing the farming capacity, but also by increasing animal growth performance and improving animal health and robustness in general. However, the animals are often susceptible to disease leading to poor feed conversion ratios, low growth performance and low survival rates. In particular, robustness reflected in the gastrointestinal health and integrity are essential factors when it comes to growth performance. Resistance to disease and feed additives can be used to achieve this.

Mannose oligosaccharide compositions are known to improve overall health, in particular gut health of some animals. Existing mannose oligosaccharide (or mannans, or manno-oligosaccharide, or MOS) compositions currently on the market are all extracts, such as yeast extracts, mostly yeast cell wall extracts, green coffee beans extracts, konjac extracts and so on. They all present the disadvantage of not being highly pure compositions and not having consistent compositions, particularly true for yeast cell wall extracts, and consequently their activity in animals is not very predictable. Their effects fluctuate greatly. Further, the production process of such mannose oligosaccharide extracts has a non-negligible environmental impact, due to the generation of many waste streams in the extraction process.

WO2018232078 A1, filed by the applicant, relates to a mannose oligosaccharide (MOS) prepared by the polymerisation of mannose in a microreactor thus avoiding the problems mentioned above. MOS prepared in this way was shown to help manage food safety issues, in particular to combat contamination with *Salmonella* and *E. Coli* in various industries (food, feed, cosmetic and pharmaceutical). It was shown in in-vivo trials that the intake of a MOS composition was beneficial to the gastrointestinal health of various animals and increased the growth performance of the animals. Shrimp was also mentioned in this context.

Zhang et al. (Fish & Shellfish Immunology 33 (2012) 1027-1032) also discloses using mannan oligosaccharides to test the growth performance on *Litopenaeus vannamei*. However, the only MOS that was tested in the diet was a yeast-derived BIO-MOS® including inter alia a minimum of 30% protein and 1.4% crude fat.

Solidum et al. (AACL Bioflux, 2016, Volume 9, Issue 2) discloses using a MOS and β-glucan combined formula (BZT® PRE-GE) for feeding *Litopenaeus vannamei*.

Do Huu Hoang et al. (International Journal of Fisheries and Aquatic Studies 2019; 7(2): 302-307)) discloses using yeast-derived BIO-MOS® in the diet for juvenile lobsters.

However, for seafood farming, in particular for crustacean farming, not all of the MOS prepared in this manner resulted in highly increased robustness of the crustaceans reflected in parameters, such as growth performance, mortality rate and food conversation ratios. There is thus clearly still a need to provide more efficient feed additives for crustaceans, in particular shrimp. Also there is a need to provide feed additives that are produced in a more environmental friendly way. The present invention addresses those needs.

SUMMARY OF THE INVENTION

The present invention relates to the use of a mannose oligosaccharide composition, wherein the composition is soluble in water, preferably a solubility in water of 20% or more, or 50% or more, comprises less than 0.1 wt % beta-glucan on a dry weight basis, comprises at least 50 wt % of mannose oligosaccharides having a degree of polymerization of 3 or more on a dry weight basis (db), for feeding crustaceans, preferably of the order Decapoda, more preferably shrimp of the species *Litopenaeus vannamei* and *Penaeus monodon*.

In particular, said use is for the purposes of one or more of the following:

Decreasing the food conversion ratio

Decreasing the mortality rate of the crustaceans

Increasing the growth performance of the crustaceans

Increasing the growth of the crustaceans intestinal midgut epithelium and brusborder height, as measured by histology Increasing gut integrity Increasing the survival rate in case of bacterial infection of the crustaceans in particular when compared to feeding crustaceans without any mannose oligosaccharide composition; or with a mannose oligosaccharide composition having a mannose oligosaccharide content with a degree of polymerization of 3 or more of less than 50 wt % at the same inclusion rate in the diet; or with a mannose oligosaccharide composition having a beta-glucan content greater than 0.1 wt % on a dry weight basis at the same inclusion rate in the diet.

The invention also covers a mannose oligosaccharide composition, which is soluble in water, preferably having a solubility in water of 20% or more, or of 50% or more, comprising less than 0.1 wt % beta-glucan on a dry weight basis (db), comprising at least 50 wt % of mannose oligosaccharides having a degree of polymerization of 3 or more on a dry weight basis (db)

optionally, obtainable by the polycondensation of mannose in a microreactor, and optionally, comprising $\alpha,\beta$-(1,6) linkages and $\alpha,\beta$-(1,3) linkages, wherein preferably at least 50% of the linkages are $\alpha,\beta$-(1,6) linkages and $\alpha,\beta$-(1,3) linkages, for use in the prophylactic treatment of crustaceans to prevent or reduce the severity of bacterial infections, in particular bacterial infections caused by *Vibrio* spp.

The present invention also relates to a feed composition suitable for feeding crustaceans, preferably of the order Decapoda, more preferably shrimp of the species *Litopenaeus vannamei* and *Penaeus monodon*, comprising a mannose oligosaccharide composition, which:

is soluble in water, preferably a solubility in water of 20% or more, or 50% or more, comprises less than 0.1 wt % beta-glucan on a dry weight basis, comprises at least 50 wt % of mannose oligosaccharides having a degree of polymerization of 3 or more, optionally obtainable by the polycondensation of mannose in a microreactor, and optionally comprises $\alpha,\beta$-(1,6) linkages and $\alpha,\beta$-(1,3) linkages, wherein preferably at least 50% of the linkages are $\alpha,\beta$-(1,6) linkages and $\alpha,\beta$-(1,3) linkages, wherein the feed composition further comprises one or more other feed ingredients, preferably suitable for feeding crustaceans. The one or more other feed ingredients can be selected from fishmeal, other marine-based proteins, plant-based proteins, fish or plant-based oil(s), whole wheat, wheat flour, minerals, vitamins, lecithin, cholesterol, colorants (such as carbon black) and palatability enhancers (such as hydrolysed marine proteins).

The feed composition according to the invention, can be prepared by a method including spray drying, extrusion, pelletizing, granulation or agglomeration. Finally, the present invention also relates to a crustacean fed with the feed composition according to the invention, preferably of the order Decapoda. The present invention also relates to a crustacean fed with the feed composition according to the invention, preferably of the order Decapoda.

In particular, the shrimp of the species *Litopenaeus vannamei* and *Penaeus monodon* fed with the feed composition according to the invention have an increased pink colour when cooked compared to the same cooked shrimp fed:

without any mannose oligosaccharide composition; or with a mannose oligosaccharide composition having a mannose oligosaccharide content with a degree of polymerization of 3 or more of less than 50 wt % at the same inclusion rate in the diet; or with a mannose oligosaccharide composition having a beta-glucan content greater than 0.1 wt % on a dry weight basis at the same inclusion rate in the diet.

DETAILED DESCRIPTION

The use of "a" or "an" to describe the various elements or components herein is merely for convenience and to give a general sense of the invention. This description should be read to include one or at least one, and the singular also includes the plural unless it is obvious that it is meant otherwise.

The invention is defined in the appended claims. At least one aspect of the invention is based on the finding that the mannose oligosaccharide composition comprising according to the present invention ("composition of the present invention" or "mannose oligosaccharide composition of the present invention") has improved effects as a feed for crustaceans compared to existing MOS compositions.

Each feature described in any of the embodiments herein can be combined with any other feature disclosed in other embodiments.

The Crustaceans

By crustaceans it is meant herein any of the arthropods of the class Crustacea. These live mostly in water and have a hard shell, a segmented body, and jointed appendages. Targeted crustaceans of this invention are those that are farmed and thus require feeding. Farming of crustaceans includes herein mariculture, (which can take place on the open ocean, an enclosed section of the ocean, or in tanks, ponds or raceways which are filled with seawater), aquaponics, integrated multi-trophic aquaculture, freshwater aquaculture (using ponds, reservoirs, lakes, rivers, and other inland waterways, for instance brackish water).

Preferably the crustaceans according to the invention are of the class Malacostraca and order Decapoda, which include shrimp, prawns, crabs, lobsters (including langoustine), spiny lobsters or crayfish (also known as crawfish). (Shrimp and prawn are used herein interchangeably to mean the same type of animal, as the terms shrimp and prawn have no definite reference to any known taxonomic groups. Although colloquially the term shrimp is sometimes applied to smaller species, while prawn is more often used for larger forms, there is in fact no clear scientific distinction between both terms.)

The crustaceans are preferably of the suborder Dendrobranchiata. Examples of farmed species suitable for this invention include:

Whiteleg shrimp, also known as Pacific white shrimp or king prawn (*Litopenaeus vannamei*, formerly also known as *Penaeus vannamei*)

Giant tiger prawn, also known as the Asian tiger shrimp or black tiger shrimp (*Penaeus monodon*)

Indian white prawn, also known as Indian prawn (*Fenneropenaeus indicus*, formerly known as *Penaeus indicus*)

The crustaceans can also be of the suborder Pleocyemata. Examples of farmed species suitable for this invention include:

Indo-Pacific swamp crab or also known as mud crab or mangrove crab (*Scylla serrata*)

Red swamp crawfish or also known as red swamp crawfish, red swamp crayfish, Louisiana crawfish, Louisiana crayfish or mudbug (*Procambarus clarkii*)

Scalloped spiny lobster (*Panulirus homarus*)

Ornate spiny lobster, also known as ornate rock lobster, tropical rock lobster, or ornate tropical rock lobster (*Panulirus ornatus*)

Giant river prawn, also known as giant freshwater prawn (*Macrobrachium rosenbergii*)

Chinese mitten crab, also known as Shanghai hairy crab (*Eriocheir sinensis*)

Red claw crayfish, also known as Australian red claw crayfish, Queensland red claw, redclaw, tropical blue crayfish or freshwater blueclaw crayfish (*Cherax quadricarinatus*)

Other examples of crustaceans include Brine shrimp (*Artemia* spp). The brine shrimp fed with the MOS according to the invention can then be used as live feed for crustaceans larger than Brine shrimp, thereby incorporating the MOS indirectly into the feed of the larger crustaceans. The larger crustaceans are preferably selected from the order Decapoda, more preferably suborders Dendrobranchiata and Pleocyemata, most preferably shrimp of the species *Litopenaeus vannamei* or *Penaeus monodon.*

The crustaceans according to the invention are more preferably shrimp, prawn, crab, lobster (including langoustine), crayfish (crawfish) of the suborders Dendrobranchiata and Pleocyemata. More preferably the crustaceans are shrimp or prawn of the suborders Dendrobranchiata and Pleocyemata, even more preferably of the suborder Dendrobranchiata. MOSt preferably, the crustaceans are shrimp of the species *Litopenaeus vannamei* and/or *Penaeus monodon.*

The invention also concerns crustaceans that have been fed with the feed composition according to the invention. Preferably the crustaceans are selected from the order Decapoda, more preferably of the suborders Pleocyemata and Dendrobranchiata, most preferably shrimp, such as shrimp of the species *Litopenaeus vannamei* or *Penaeus monodon.*

It has been observed that the shrimp of the species *Litopenaeus vannamei* or *Penaeus monodon* that have been fed with the feed composition according to the invention have an increased pink color when cooked compared to the shrimp fed:

without any mannose oligosaccharide composition; or with a mannose oligosaccharide composition having a mannose oligosaccharide content with a degree of polymerization of 3 or more of less than 50 wt % at the same inclusion rate in the diet; or with a mannose oligosaccharide composition having a beta-glucan content greater than 0.1 wt % on a dry weight basis at the same inclusion rate in the diet. This increased pink color is appreciated and sought after by the consumer.

The Mannose Oligosaccharide Composition (MOS Composition)

In the present description, the terms mannose oligosaccharide, manno-oligosaccharide, mannans, mannan-oligosaccharide and MOS are used interchangeably to describe the same. Mannose oligosaccharide is defined as an oligosaccharide of mannose having a DP of 3 or more. DP refers to the degree of polymerisation, i.e. the number of monomers present in the oligosaccharide. In mannose oligosaccharide, the monomer is mannose. Contrary to expectations, the mannose oligosaccharide composition suitable for the purposes of this invention comprises at least 50 wt % mannose oligosaccharides having a DP of 3 or more. Surprisingly, it was this higher average molecular weight mannose oligosaccharide composition that resulted in the improved growth and survival rates of the crustaceans. Mannose oligosaccharide compositions having less than 50 wt % of mannose oligosaccharides with a DP of 3 or more performed surprisingly less well. Without being bound to theory, it is thought that this might be due to the mannose oligosaccharide having a higher average molecular weight having a more pronounced prebiotic effect than the shorter chain mannose oligosaccharides.

HPLC analysis (ISO 10504:1998-10) can be done to determine the amount and type of the various other saccharides present in the mannose oligosaccharide composition, such as DP1, DP2, DP3 and higher.

The current invention relates to the use of a composition comprising mannose oligosaccharide characterized in that the composition is soluble in water. The composition of the present invention has a solubility of 20% or more, more preferably of 30% or more, even more preferably of 40% or more, yet even more preferably of 50% or more, yet even more preferably of 60% or more. The solubility of the composition of the present invention may thus range from 20 to 90%, more preferably from 30 to 85%, yet even more preferably from 40 to 80%, yet even more preferably from 50 to 75%, most preferably from 60 to 75%. Solubility may be measured according to test A as described hereafter.

Test A

A 10 wt % aqueous solution of the composition to be measured is provided, heated up to 40° C. and kept at 40° C. for 1 hour.

The composition is then filtered over a 0.45 μm pore size filter to remove any undissolved material and the filtrate is recovered.

The filtrate is then submitted to HPLC analysis (ISO 10504: 1198-10) and the results are recorded Solubility is expressed in % and corresponds to the total saccharide content in the filtrate compared to the dry matter of the initial 10 wt % aqueous solution.

The MOS composition according to the present invention can be readily dissolved in water. It forms a clear solution in water.

Preferably, the MOS composition of the present invention is further characterized in that it comprises less than 0.1 wt % db, preferably less than 0.01 wt % db, more preferably less than 0.001 wt % db of beta-glucan. MOSt preferably the MOS composition of the present invention does not comprise beta-glucan or is substantially free of beta-glucan. MOSt mannose oligosaccharide of the prior art contain high amounts of beta-glucan, typically in a ratio mannose-oligosaccharide:beta-glucan of 1:1. These compositions are believed to have a positive effect due to the presence of beta-glucan. It has surprisingly been found that the compositions of the present invention have a positive effect despite containing very low amounts of beta-glucan or no beta-glucan at all as described above.

Further, the MOS composition is characterized in that it is not obtained, derived, isolated or extracted from yeast or vegetable fibres, such as from konjac or from coffee beans.

Preferably, the MOS composition of the present invention is further characterized in that the mannose oligosaccharide content, i.e. mannose oligosaccharide having a DP of 3 or more, is at least 50 weight % (wt %), preferably at least 55 wt %, more preferably at least 60 wt %, even more preferably at least 65 wt %, yet even more preferably at least 70 wt %, most preferably at least 80 wt %, on a dry weight basis of the composition (db).

The MOS composition of the present invention is preferably a source of mannose disaccharide (DP2). Thus preferably the MOS composition of the present invention has a content of DP2, of from 10 to 35 wt % db, preferably of from 15 to 30 wt % db, preferably of from 15 to 20 wt % db. The content of DP2 may be about 15 wt % db. The content of DP2 may be about 16 wt % db. The content of DP2 may be about 17 wt % db. The content of DP2 may be about 18 wt % db. The content of DP2 may be about 19 wt % db. The content of DP2 may be about 20 wt % db.

Further, the MOS composition may contain fructose, in an amount of up to 10 wt % db, such as from 0.5 to 10 wt % db, preferably up to 5 wt % db, more preferably up to 3 wt % db, more preferably up to 1 wt % db.

Further, the MOS composition may contain mannose in an amount of from 5 to 30 wt % db, preferably from 5 to 20 wt % db. The content of mannose may be about 15 wt % db.

Further, the MOS composition may contain glucose, in an amount of from 1 to 15 wt % db, preferably 1 to 10 wt % db, more preferably 1 to 5 wt % db. The content of glucose is preferably less than 10 wt % db, more preferably less than 5 wt % db.

The dry substance of the MOS composition can be adapted to the need of its application. The dry substance may be at least 70 wt %, preferably at least 75 wt %, more preferably at least 80 wt %, even more preferably at least 90 wt %, yet even more preferably at least 95 wt %, such as for example from 95 to 99 wt %. The MOS composition can be stored either in powder form or in liquid form or supported on a solid carrier. In powder form, the MOS composition of the present invention is a stable, yellowish to white, free flowing powder.

Further, the MOS composition may be characterised in that the mannose oligosaccharide comprises predominantly alpha- & beta-1,6 and alpha-1,3 type linkages. Preferably at least 50%, more preferably at least 75%, even more preferably at least 80% of the linkages are alpha- & beta-1,6 and alpha-1,3 type linkages. These can be measured using standard H$^1$ NMR techniques.

Process for Preparing the MOS Composition in Microreactors

The mannose oligosaccharide composition for use according to the invention is obtainable by the polycondensation of mannose in a microreactor.

The polycondensation of mannose in the microreactor takes place at a temperature of 140 to 300° C., preferably 160 to 250° C., more preferably 170 to 230° C. The residence time of the mannose in the microreactor is from 0.1 to 600 seconds (sec), more preferably from 0.3 to 300 sec, even more preferably from 0.5 to 150 sec, most preferably from 1 to 100 sec, and the pressure in the microreactor is from 0.5 to 30 bar, preferably from 1.0 to 15 bar, and more preferably from 1.0 to 10 bar.

The process for making the mannose oligosaccharide composition comprises the steps of:
  a) Polycondensing mannose by passing the mannose through a microreactor at a temperature of from 140° C. to 300° C. in the presence of an acidifying catalyst to produce manno-oligosaccharide containing composition,
  b) Optionally neutralising and/or decolorizing the manno-oligosaccharide composition,
  c) Optionally refining the manno-oligosaccharide composition,
  d) Collecting the manno-oligosaccharide composition.

The mannose may be a mannose containing composition, isolated mannose, a mannose solution or a mixture of these. Preferably the mannose is an aqueous mannose solution. The concentration of the mannose in the aqueous mannose solution is not important, however, it is advantageous to have the aqueous mannose solution as concentrated as possible consistent with viscosity requirements. Therefore, it is advantageous that the aqueous mannose solution comprises from 10 to 90 wt % dry substance, preferably from 15 to 80 wt % dry substance, more preferably from 40 to 70 wt % dry substance, even more preferably from 50 to 60 wt % dry substance.

The amount of acidifying catalyst used is preferably in a weight ratio to mannose of mannose:acidifying catalyst 100:0.005 to 100:20, more preferably from 100:0.5 to 100:10, even more preferably from 100:1 to 100:5.

Preferably the acidifying catalyst is citric acid, sulphuric acid and/or phosphoric acid.

Preferably, the acidifying catalyst is mixed with the mannose before it is passed through the microreactor.

The temperature of the microreactor in step a) is from 140 to 300° C., more preferably 160 to 250° C., most preferably 170 to 230° C.

The residence time of the mannose containing composition in the microreactor during step a) is preferably from 0.1 to 600 sec, more preferably from 0.3 to 300 sec, even more preferably from 0.5 to 150 sec, most preferably from 1 to 100 sec and the pressure in the microreactor is from 0.5 to 30 bar, preferably from 1.0 to 15 bar, more preferably from 1.0 to 10 bar.

Preferably, before step a), the mannose is passed through a first microreactor in the presence of the acidifying catalyst at a lower temperature than the temperature of step a) described above. Said lower temperature is preferably from 90° C. to 180° C., more preferably from 100° C. to 175° C., yet more preferably from 120° C. to 175° C., even more preferably from 140° C. to 170° C., most preferably from 150° C. to 165° C. Some polycondensation may already take place during this step. Preferably the residence time of the mannose containing composition in the first microreactor is quite short, such as 5 seconds or lower, preferably 4 seconds or lower, more preferably 3 seconds or lower, even more preferably 2 seconds or lower, such as from 0.1 to 2 seconds or from 0.3 to 1 second or from 0.5 to 1 second.

The first microreactor and the microreactor of step a) can have the same configuration, they may be similar, and they may even be the same microreactor, when the process is performed batch wise for example. The process of the present invention can run in batch, semi-continuous, pulse or continuous manner, preferably it is run in a continuous manner. Thus preferably, the present invention relates to a process comprising
  a0) Passing mannose through a microreactor at a temperature of from 90° C. to 180° C. in the presence of an acidifying catalyst to obtain a heated mannose,
  a) Polycondensing the heated mannose through a microreactor at a temperature of from 140° C. to 300° C. in the presence of the acidifying catalyst,
  b) Optionally neutralising and/or decolorizing the manno-oligosaccharide composition,
  c) Optionally refining the manno-oligosaccharide composition,
  d) Collecting the manno-oligosaccharide composition,
  wherein the acidifying catalyst is preferably citric acid, sulphuric acid and/or phosphoric acid.

The temperature in step (a) is preferably 160 to 250° C. and more preferably 170 to 230° C.

If needed before collecting the manno-oligosaccharide composition or after step c) and/or d), a cooling step may be done to reduce the temperature of the manno-oligosaccharide composition.

The manno-oligosaccharide composition can be prepared in a single-run through a microreactor, through multiple sequential microreactors, or multiple runs through the same microreactor.

Preferably the manno-oligosaccharide composition is neutralised. Neutralising the manno-oligosaccharide composition may be done until the composition reaches a pH of from 4 to 7. This is advantageous for an increased stability of the product, e.g. less hydrolysis over time and thus less to no change in composition of the product. Also an advantage is that the product is then suitable for use with other ingredients that are sensitive to acids or acidic conditions. Neutralisation may be done with any suitable base. Preferably, in particular when the manno-oligosaccharide composition is to be used in food and may be also in feed and pet food, the base is caustic and/or potassium hydroxide.

It should be noted that it is possible to either neutralise the manno-oligosaccharide composition or to decolorize the manno-oligosaccharide composition or to do both.

Optionally, the manno-oligosaccharide composition can refined or purified via chromatography (for example, to remove at least partially some DP1 and DP2) using processes known in the art.

The present invention further relates to a MOS composition obtainable by the process of the present invention. Indeed such MOS composition has, amongst others, the improved effects as discussed herein.

Uses and Effects of the MOS Composition in Crustaceans

A number of uses and effects described below have been observed when feeding crustaceans the MOS composition according to the invention compared to crustaceans that have been fed with a control diet or in particular compared to crustaceans that have been fed:

without any mannose oligosaccharide composition; or with a mannose oligosaccharide composition having a mannose oligosaccharide content with a degree of polymerization of 3 or more of less than 50 wt % at the same inclusion rate in the diet; or with a mannose oligosaccharide composition having a beta-glucan content greater than 0.1 wt % on a dry weight basis at the same inclusion rate in the diet.

It has been surprisingly found that the MOS composition according to the present invention has an improved effect on the growth performance of crustaceans fed with said composition. The growth performance of crustaceans is understood to be the weight gain and feed intake of the animal. In particular, MOS compositions of the present invention characterized in that their content of MOS having a DP of 3 or more is at least 50 wt % db have a surprisingly improved effect on the growth performance of crustaceans in particular. This is in contrast to WO2018232078, wherein MOS compositions having a MOS content with a DP of 3 or more of 40 wt % db or lower, for example from 35 to 40 wt % db, were preferred for the growth performance of various other animals.

It has been surprisingly found that the use of the MOS composition according to the present invention for feeding crustaceans is able to decrease the food conversion ratio. This means that less feed is needed to produce the same weight of crustaceans.

In addition, it has been surprisingly found that the use of the MOS composition according to the present invention decreases the mortality rate of the crustaceans. This means that less crustaceans died when fed with the feed composition comprising the MOS composition according to the present invention.

Further, it has been surprisingly found that the use of the MOS composition according to the present invention for feeding crustaceans also increased the length of the crustaceans' intestinal microvilli. The increased midgut epithelium and brusborder height can be measured by histology.

Finally, it has been surprisingly found that the use of the MOS composition according to the present invention for feeding crustaceans also increased the survival rate of the crustaceans in the presence of a bacterial infection.

The most common bacterial infection of *Litopenaeus vannamei* and *Penaeus monodon* is *Vibrio* spp., particularly *Vibrio harveyi, Vibrio parahaemolyticus* and *Vibrio alginolyticus*. These infections may cause various important syndromes, such as luminescence & the so-called zoea-2 & bolitas syndromes. In hatchery, infections are commonly manifested as: luminescence in water &/or of the shrimp body; disruption of the gut; fouling of body; reduced feeding & high mortality rates. In ponds, high levels of vibrios are associated with red discoloration of shrimp (especially tails) & internal & external necrosis; low feeding & chronic mortality; vibriosis may cause secondary infections, as the weakened shrimp become more susceptible to viral infections. Common management systems include disinfecting facilities, equipment, water and workers, using bacteria-free live feeds, covering culture tanks with plastic sheets to prevent transfer to other tanks. Furthermore, good water & feed management is needed to control stocking density & aeration to maintain optimal environmental conditions throughout culture cycle.

It has been surprisingly found that the use of the MOS composition according to the invention markedly improves that survival rate of the crustaceans when infected with *Vibrio* spp.

The invention thus also covers a mannose oligosaccharide composition, which is soluble in water, preferably having a solubility in water of 20% or more, or of 50% or more, comprising less than 0.1 wt % beta-glucan on a dry weight basis (db), comprising at least 50 wt % of mannose oligosaccharides having a degree of polymerization of 3 or more on a dry weight basis (db)

optionally, obtainable by the polycondensation of mannose in a microreactor, and optionally, comprising α,β-(1,6) linkages and α,β-(1,3) linkages, wherein preferably at least 50% of the linkages are α,β-(1,6) linkages and α,β-(1,3) linkages, for use in the prophylactic treatment of crustaceans to prevent or reduce the severity of bacterial infections, in particular bacterial infections caused by *Vibrio* spp.

The MOS composition according to the invention markedly improves the overall robustness of the crustaceans.

Finally, the crustaceans (and in particular shrimp of the species *Litopenaeus vannamei* and *Penaeus monodon*) fed with the feed composition according to the invention have an increased pink colour when cooked compared to the same cooked crustaceans fed:

without any mannose oligosaccharide composition; or with a mannose oligosaccharide composition having a mannose oligosaccharide content with a degree of polymerization of 3 or more of less than 50 wt % at the same inclusion rate in the diet; or with a mannose oligosaccharide composition having a beta-glucan content greater than 0.1 wt % on a dry weight basis at the same inclusion rate in the diet.

The Feed Composition

The invention also covers a feed composition suitable for feeding crustaceans of the order Decapoda, preferably of the suborders Dendrobranchiata and Pleocyemata, more preferably shrimp, most preferably shrimp of the species *Litopenaeus vannamei* and *Penaeus monodon*, comprising a mannose oligosaccharide composition, which:

is soluble in water, preferably a solubility in water of 20% or more, comprises less than 0.1 wt % beta-glucan on a dry weight basis, comprises at least 50 wt % of mannose oligosaccharides having a degree of polymerization of 3 or more, optionally, obtainable by the polycondensation of mannose in a microreactor, and optionally, comprises $\alpha,\beta$-(1,6) linkages and $\alpha,\beta$-(1,3) linkages, wherein preferably at least 50% of the linkages are $\alpha,\beta$-(1,6) linkages and $\alpha,\beta$-(1,3) linkages, wherein the feed composition further comprises one or more other feed ingredients (suitable for feeding crustaceans). These can be selected from one or more of fishmeal, other marine-based proteins, plant-based proteins, fish or plant-based oil(s), whole wheat, wheat flour, minerals, vitamins, lecithin, cholesterol, colorants (such as carbon black) and palatability enhancers (such as hydrolysed marine proteins).

All of the features of the mannose oligosaccharide mentioned in the description above apply equally to the mannose oligosaccharide composition comprised in the feed composition according to the invention.

The feed composition suitable for feeding crustaceans of the order Decapoda, preferably of the suborders Dendrobranchiata or Pleocyemata, more preferably shrimp, most preferably shrimp of the species *Litopenaeus vannamei* and *Penaeus monodon*, comprises in addition to the MOS composition of the present invention, feed ingredients typically used for such feed. The person skilled in the art of preparing feed for crustaceans is aware of typical and specific compositions needed in that feed. Other feed ingredients typically used in a feed composition suitable for crustaceans include one or more of fishmeal, other marine-based proteins, plant-based proteins, fish or plant-based oil(s), whole wheat, wheat flour, minerals, vitamins, lecithin, cholesterol, and palatability enhancers (such as hydrolysed marine proteins).

Any fishmeal or other marine-based proteins (e.g. krill-meal) that are commercially available can be used herein to provide the necessary protein in the feed composition. Alternatively or additionally or as a (partial) substitute of fishmeal, insect meal can be used. The skilled person typically knows how much fishmeal and/or insect meal is needed depending on the target species.

The skilled person typically knows what types of minerals and vitamins and how much of each is needed, depending on the target species.

For feeding crustaceans, in particular shrimp or prawns, such as *Litopenaeus vannamei* and *Penaeus monodon*, cholesterol and phospholipids are frequently recommended optional feed ingredients.

Palatability enhancers include feed additives and ingredients, such as hydrolysed marine proteins.

In particular, the inclusion rate of the MOS composition according to the invention in the feed composition is preferably from 0.01 to 0.9 wt % of the feed composition, preferably from 0.05 to 0.8 wt % of the feed composition, more preferably from 0.1 to 0.6 wt % of the feed composition, most preferably from 0.1 to 0.5 wt % of the feed composition, on a dry weight basis. Feed compositions intended for feeding *Litopenaeus vannamei* and *Penaeus monodon* was surprisingly more effective at inclusion rates of from 0.01 to 0.9 wt % of the MOS composition in the feed composition. At 1 wt % or higher the effects listed above were far less pronounced.

The feed composition according to the invention can be prepared by any known method. These include spray drying, extrusion, pelletizing, granulation or agglomeration.

Clauses of the Invention

The invention covers the following:

CLAUSE 1: Use of a mannose oligosaccharide composition for feeding crustaceans, preferably of the order Decapoda, wherein the composition is soluble in water, preferably having a solubility in water of 20% or more, or of 50% or more, comprises less than 0.1 wt % beta-glucan on a dry weight basis (db), and comprises at least 50 wt % of mannose oligosaccharides having a degree of polymerization of 3 or more on a dry weight basis (db).

CLAUSE 2: The use according to clause 1 wherein the mannose oligosaccharide composition is not obtained from yeast or vegetable fibres.

CLAUSE 3: The use according to clause 1 or 2 wherein the composition is obtainable by the polycondensation of mannose in a microreactor.

CLAUSE 4: The use according to clause 3, wherein the polycondensation of mannose in the microreactor takes place at a temperature of 140 to 300 □C, preferably 160 to 250 □C, more preferably 170 to 230 □C and wherein the residence time of the mannose in the microreactor is from 1 to 600 seconds (sec.), preferably from 1 to 300 sec., more preferably from 1 to 150 sec., and the pressure in the microreactor is from 0.5 to 30 bar, preferably from 1.0 to 15 bar, and more preferably from 1.0 to 10 bar.

CLAUSE 5: The use according to any one of the preceding clauses wherein the mannose oligosaccharide composition comprises $\alpha,\beta$-(1,6) linkages and $\alpha,\beta$-(1,3) linkages, wherein preferably at least 50% of the linkages are $\alpha,\beta$-(1,6) linkages and $\alpha,\beta$-(1,3) linkages.

CLAUSE 6: The use according to any one of the preceding clauses wherein the mannose oligosaccharide composition is in the liquid form, powder form or supported on a solid carrier.

CLAUSE 7: The use according to any one of the preceding clauses wherein the crustacean is fed daily or every 2, 3, 4 or 5 days with the mannose oligosaccharide composition or with a feed composition comprising the mannose oligosaccharide composition.

CLAUSE 8: The use according to any one of the preceding clauses wherein the crustaceans are selected from one or more crustaceans of the suborders Dendrobranchiata and Pleocyemata.

CLAUSE 9: The use according to clause 8 wherein the crustacean is a shrimp, preferably of the species *Litopenaeus vannamei* or *Penaeus monodon*.

CLAUSE 10: The use according to any one of the preceding clauses wherein the amount of the mannose oligosaccharide composition in a feed composition is from 0.01 to 0.9 wt % of the feed composition, preferably from 0.05 to 0.8 wt % of the feed composition, more preferably from 0.1 to 0.6 wt % of the feed composition, most preferably from 0.1 to 0.5 wt % of the feed composition, on a dry weight basis.

CLAUSE 11: The use according to any one of the preceding clauses for the purposes of one or more of the following:

Decrease the food conversion ratio

Decrease the mortality rate of the crustaceans

Increase the growth performance of the crustaceans

Increase the growth the crustaceans' intestinal microvilli, midgut epithelium and brushborder height, as measured by histology Increase gut integrity Increase the survival rate in case of bacterial infection of the crustaceans compared to when feeding crustaceans without any mannose oligosaccharide composition; or with a mannose oligosaccharide composition having a mannose oligosaccharide content with a degree of polymerization of 3 or more of less than 50 wt % at the same inclusion rate in the diet; or with a mannose oligosaccharide composition having a beta-glucan content greater than 0.1 wt % on a dry weight basis at the same inclusion rate in the diet.

CLAUSE 12: A mannose oligosaccharide composition, which is soluble in water, preferably having a solubility in water of 20% or more, or of 50% or more, comprising less than 0.1 wt % beta-glucan on a dry weight basis (db), comprising at least 50 wt % of mannose oligosaccharides having a degree of polymerization of 3 or more on a dry weight basis (db)

optionally, obtainable by the polycondensation of mannose in a microreactor, and optionally, comprising $\alpha,\beta$-(1,6) linkages and $\alpha,\beta$-(1,3) linkages, wherein preferably at least 50% of the linkages are $\alpha,\beta$-(1,6) linkages and $\alpha,\beta$-(1,3) linkages, for use in the prophylactic treatment of crustaceans to prevent or reduce the severity of bacterial infections, in particular bacterial infections caused by *Vibrio* spp.

CLAUSE 13: A feed composition suitable for feeding crustaceans, preferably of the order Decapoda, more preferably of the suborders Dendrobranchiata and Pleocyemata, more preferably shrimp, most preferably shrimp of the species *Litopenaeus vannamei* and *Penaeus monodon*, comprising a mannose oligosaccharide composition, which:

is soluble in water, preferably a solubility in water of 20% or more, or 50% or more, comprises less than 0.1 wt % beta-glucan on a dry weight basis, comprises at least 50 wt % of mannose oligosaccharides having a degree of polymerization of 3 or more, optionally, obtainable by the polycondensation of mannose in a microreactor, and optionally, comprises $\alpha,\beta$-(1,6) linkages and $\alpha,\beta$-(1,3) linkages, wherein preferably at least 50% of the linkages are $\alpha,\beta$-(1,6) linkages and $\alpha,\beta$-(1,3) linkages, wherein the feed composition further comprises one or more other feed ingredients.

CLAUSE 14: The feed composition according to clause 13 wherein the one or more other feed ingredient(s) are selected from fishmeal, other marine-based proteins, plant-based protein, whole wheat, wheat flour, fish or plant-based oil, minerals, vitamins, lecithin, cholesterol, colorants, and palatability enhancers.

CLAUSE 15: The feed composition according to clause 13 or 14, wherein the amount of the mannose oligosaccharide composition in the feed composition is from 0.01 to 0.9 wt % of the feed composition, preferably from 0.05 to 0.8 wt % of the feed composition, more preferably from 0.1 to 0.6 wt % of the feed composition, most preferably from 0.1 to 0.5 wt % of the feed composition, on a dry weight basis.

CLAUSE 16: The feed composition according to any one of clause 13 to 15 for use in the prophylactic treatment of crustaceans to prevent or reduce the severity of bacterial infections, in particular bacterial infections caused by *Vibrio* spp.

CLAUSE 17: A crustacean fed with the feed composition according to any one of clauses 13 to 16 or a mannose oligosaccharide composition which:

is soluble in water, preferably having a solubility in water of 20% or more, or 50% or more, comprises less than 0.1 wt % beta-glucan on a dry weight basis, comprises at least 50 wt % of mannose oligosaccharides having a degree of polymerization of 3 or more, optionally, obtainable by the polycondensation of mannose in a microreactor, and optionally, comprises $\alpha,\beta$-(1,6) linkages and $\alpha,\beta$-(1,3) linkages, wherein preferably at least 50% of the linkages are $\alpha,\beta$-(1,6) linkages and $\alpha,\beta$-(1,3) linkages, wherein the fed crustacean is preferably selected from the order Decapoda, more preferably shrimp of the suborders Dendrobranchiata and Pleocyemata.

The crustacean according to this clause can be comprised in a food. It can be a cooked or raw crustacean, ready to eat.

CLAUSE 18: The crustacean according to clause 17, wherein the crustacean is brine shrimp (*Artemia* spp.).

CLAUSE 19: Use of the brine shrimp according to clause 18 to feed crustaceans larger than brine shrimp, preferably selected from the order Decapoda, more preferably suborders Dendrobranchiata and Pleocyemata, most preferably shrimp of the species *Litopenaeus vannamei* or *Penaeus monodon*.

CLAUSE 20: The crustacean according to clause 17, wherein the crustacean is selected from shrimp of the species *Litopenaeus vannamei* or *Penaeus monodon*.

CLAUSE 21: The crustacean (e.g. shrimp) according to clause 17 having an increased pink color when cooked compared to the crustacean fed:

without any mannose oligosaccharide composition; or with a mannose oligosaccharide composition having a mannose oligosaccharide content with a degree of polymerization of 3 or more of less than 50 wt % at the same inclusion rate in the diet; or with a mannose oligosaccharide composition having a beta-glucan content greater than 0.1 wt % on a dry weight basis at the same inclusion rate in the diet.

CLAUSE 22: The shrimp of the species *Litopenaeus vannamei* or *Penaeus monodon* according to clause 20 having an increased pink color when cooked compared to the shrimp fed:

without any mannose oligosaccharide composition; or with a mannose oligosaccharide composition having a mannose oligosaccharide content with a degree of polymerization of 3 or more of less than 50 wt % at the same inclusion rate in the diet; or with a mannose oligosaccharide composition having a beta-glucan content greater than 0.1 wt % on a dry weight basis at the same inclusion rate in the diet.

CLAUSE 23: Use of the crustacean according to clause 17, wherein the crustacean is brine shrimp (*Artemia* spp.), to feed crustaceans larger than brine shrimp, preferably selected from the order Decapoda, more preferably suborders Dendrobranchiata and Pleocyemata, most preferably shrimp of the species *Litopenaeus vannamei* or *Penaeus monodon.*

CLAUSE 24: Food comprising the cooked crustacean according to clause 17, wherein the crustacean is preferably shrimp of the species *Litopenaeus vannamei* or *Penaeus monodon,* wherein the crustacean has an increased pink color when cooked compared to the cooked crustacean fed:

without any mannose oligosaccharide composition; or with a mannose oligosaccharide composition having a mannose oligosaccharide content with a degree of polymerization of 3 or more of less than 50 wt % at the same inclusion rate in the diet; or with a mannose oligosaccharide composition having a beta-glucan content greater than 0.1 wt % on a dry weight basis at the same inclusion rate in the diet.

CLAUSE 25: A method of feeding crustaceans comprising feeding a feed composition to the crustaceans comprising a mannose oligosaccharide composition, which:

is soluble in water, preferably a solubility in water of 20% or more, or 50% or more, comprises less than 0.1 wt % beta-glucan on a dry weight basis, comprises at least 50 wt % of mannose oligosaccharides having a degree of polymerization of 3 or more, optionally, obtainable by the polycondensation of mannose in a microreactor, and optionally, comprises $\alpha,\beta$-(1,6) linkages and $\alpha,\beta$-(1,3) linkages, wherein preferably at least 50% of the linkages are $\alpha,\beta$-(1,6) linkages and $\alpha,\beta$-(1,3) linkages, wherein the feed composition may further comprises one or more other feed ingredients.

CLAUSE 26: The method according to clause 25 wherein the one or more other feed ingredient(s) are selected from fishmeal, other marine-based proteins, plant-based protein, whole wheat, wheat flour, fish or plant-based oil, minerals, vitamins, lecithin, cholesterol, and palatability enhancers.

CLAUSE 27: The method according to clause 25 or 26 wherein the crustaceans are selected from the order Decapoda, more preferably of the suborders Dendrobranchiata and Pleocyemata, more preferably shrimp, most preferably shrimp of the species *Litopenaeus vannamei* and *Penaeus monodon.*

The present invention will be illustrated by the following non-limiting examples.

EXAMPLES

I. Production of MOS

1. MOS 1 (According to the Invention)

The starting mannose containing solution (obtained from the conversion of glucose to mannose over a sodium molybdate catalyst supported on a resin) was placed in an evaporator under vacuum pressure under elevated temperatures (approximately 134° C.) to remove excess water and increase the dry substance from 50% to approximately 85. The solution was then placed into a buffer tank to ensure there was sufficient product to feed into the microreactor. A 50% citric acid solution was added to reach 3 wt % at 90° C. The product was then flash heated from 90° C. to approximately 220° C. in a micro heat exchanger.

The product was then transferred to a microreactor where polycondensation occurred between the mannose monomers at a temperature of 215° C. The pressured was held from 1.6 to 3.0 bar. The residence time in the reactor was around 15 seconds. The mannose monomers link to each other to form mannose oligosaccharide chains of varying lengths. This linking of two mannose units liberates a water molecule which increases the water content of the solution.

The product was then exposed to a 4% aqueous solution of sodium hydroxide to neutralize the citric acid and minimize any future hydrolysis. Water was added to the product and diluted to reach a concentration of approximately 50%.

The product was then run through a carbon column filter to reduce the by-products that formed during processing in the microreactor, which include furfural and colour forming by-products.

The product was then exposed to a second vacuum evaporation process at temperatures between 50° C. and 70° C. in order to minimize the change in colour of the product and reach a final dry substance concentration of about 70%.

2. MOS 2 (Comparison)

The same process as for MOS 1 was carried out except the reaction temperature was approximately 200° C. and the pressure in the microreactor was between 2.1 and 4.0 bar.

3. MOS 3 (Comparison)

The same process as for MOS 1 was carried out except the reaction temperature was approximately 195° C. and the pressure in the microreactor was between 1.6 and 3.0 bar. Summary of reaction conditions and results of the properties for each MOS (db=dry weight basis).

| | MOS 1 (invention) | MOS 2 (comparison) | MOS 3 (comparison) |
|---|---|---|---|
| Dry substance of starting mannose solution (wt %) | 85 | 85 | 85 |
| Micro heat exchanger temp (° C.) | 220 | 220 | 220 |
| Microreactor temp (° C.) | 215 | 200 | 195 |
| Microreactor residence time (seconds) | 15 | 15 | 15 |
| Microreactor pressure (bar) | 2.5-5.0 | 2.1-4.0 | 1.6-3.0 |
| DP of 3 or more (wt % db) | 59.1 | 46.1 | 35.1 |
| DP 2 (wt % db) | 18.0 | 22.4 | 25.4 |
| Glucose (wt % db) | 3.3 | 4.5 | 2.9 |
| Mannose (wt % db) | 15.9 | 23.7 | 34.0 |
| pH (20 wt % solution) | 5.0 | 4.9 | 6.0 |
| Solubility (%) (Test A i.e. @10% db) | 100 | 100 | 100 |
| Beta-glucan (wt % db) | None | None | None |

II. In-Vivo Growth Performance Trials

The effect of the use of mannan-oligosaccharides (MOS) according to the present invention was compared to that of other mannan-oligosaccharides (MOS) disclosed in WO2018232078 A1.

1. In-Vivo Growth Performance Trials 1

The shrimp received a reference diet compared to 6 different diets with 2 inclusion levels of the 3 different MOS described above, each having a different average molecular weight, with MOS 1 having the highest average molecular according to the invention.

REF: Reference diet without any immune stimulating product (no algae, seaweed or yeasts)

Diet 1a: 0.2 wt % of MOS 1 in the feed composition

Diet 1b: 1 wt % of MOS 1 in the feed composition

Diet 2a: 0.2 wt % of MOS 2 in the feed composition

Diet 2b: 1 wt % of MOS 2 in the feed composition

Diet 3a: 0.2 wt % of MOS 3 in the feed composition

Diet 3b: 1 wt % of MOS 3 in the feed composition

The MOS replaces only wheat flour in comparison to the reference diet, so that it could not influence protein or energy content.

The feed compositions were produced with a pellet mill on a 2 mm die with steam preconditioning with steam (at >90° C.) and postconditioning (at >90° C.) for 20 minutes.

The feed compositions were formulated according to the following table (all values are given in wt % on a dry weight basis).

| | REF diet | Diet 1a (MOS 1) | Diet 1b (MOS 1) | Diet 2a (MOS 2) | Diet 2b (MOS 2) | Diet 3a (MOS 3) | Diet 3b (MOS 3) |
|---|---|---|---|---|---|---|---|
| Gluten | 8.7 | 8.7 | 8.7 | 8.7 | 8.7 | 8.7 | 8.7 |
| Marine-based meal | 25.0 | 25.0 | 25.0 | 25.0 | 25.0 | 25.0 | 25.0 |
| Wheat | 16.3 | 16.3 | 16.3 | 16.3 | 16.3 | 16.3 | 16.3 |
| Wheat flour | 26.0 | 25.8 | 25.0 | 25.8 | 25.0 | 25.8 | 25.0 |
| Soybean meal and canola | 18.2 | 18.2 | 18.2 | 18.2 | 18.2 | 18.2 | 18.2 |
| Lecithin | 1.9 | 1.9 | 1.9 | 1.9 | 1.9 | 1.9 | 1.9 |
| Fish oil | 1.9 | 1.9 | 1.9 | 1.9 | 1.9 | 1.9 | 1.9 |
| Premix (vitamins & minerals) | 1.9 | 1.9 | 1.9 | 1.9 | 1.9 | 1.9 | 1.9 |
| MOS | 0 | 0.2 | 1 | 0.2 | 1 | 0.2 | 1.0 |
| Total | 100 | 100 | 100 | 100 | 100 | 100 | 100 |

The shrimp growth trial started with shrimp larvae weighing +/−1 g (imported to Belgium where the trials took place) and lasted for 4 weeks. There were 7 diets and 3 replicates in total for each diet, so 21 nets in total. Each net received 20 shrimp. All nets were placed in a bigger tank, so as to have the same water quality. Water quality in the big tanks was maintained with bioflocs. Each net was equipped with an individual automatic feeder. DO (dissolved oxygen) was >5 ppm, temperature was between 27 and 28° C., salinity was kept around 15-22 ppt and pH stayed above 7.3. Before the start of the growth trials, the shrimp were given the opportunity to acclimatise for 2-3 days.

The shrimp were fed daily.

At the start and every 2 weeks, shrimp were counted and weighed together to obtain average weight and total biomass, as well as the average weight of each shrimp. The results averaged over the three replicates are shown in tables 1-6. The trial ended after 4 weeks.

TABLE 1

Average weight in g

| Diet | Average weight of each shrimp at start | Average weight of each shrimp at 14 days | Average weight of each shrimp at 28 days |
|---|---|---|---|
| REF | 1.10 | 2.77 | 5.54 |
| Diet 3a | 1.15 | 2.75 | 5.93 |
| Diet 3b | 1.07 | 2.87 | 5.30 |
| Diet 2a | 1.12 | 2.93 | 5.67 |
| Diet 2b | 1.10 | 2.73 | 5.53 |
| Diet 1a | 1.13 | 2.87 | 5.98 |
| Diet 1b | 1.16 | 2.98 | 5.74 |

TABLE 2

Weekly weight gain in g/shrimp/week

| Diet | Weeks 1 + 2 | Weeks 3 + 4 | Overall weight gain |
|---|---|---|---|
| REF | 0.84 | 1.38 | 4.44 |
| Diet 3a | 0.80 | 1.59 | 4.79 |

18

TABLE 2-continued

Weekly weight gain in g/shrimp/week

| Diet | Weeks 1 + 2 | Weeks 3 + 4 | Overall weight gain |
|---|---|---|---|
| Diet 3b | 0.90 | 1.21 | 4.23 |
| Diet 2a | 0.90 | 1.37 | 4.55 |
| Diet 2b | 0.82 | 1.40 | 4.43 |
| Diet 1a | 0.87 | 1.56 | 4.85 |
| Diet 1b | 0.91 | 1.38 | 4.59 |

TABLE 3

Biomass in g

| Diet | Day 0 | Day 14 | Day 28 | Difference |
|---|---|---|---|---|
| REF | 21.91 | 49.81 | 83.28 | |
| Diet 3a | 22.90 | 53.24 | 93.11 | +12% |
| Diet 3b | 21.38 | 50.88 | 76.53 | −8% |
| Diet 2a | 22.46 | 53.78 | 93.00 | +12% |
| Diet 2b | 21.92 | 53.78 | 80.47 | −3% |
| Diet 1a | 22.51 | 54.36 | 95.31 | +14% |
| Diet 1b | 23.15 | 55.55 | 80.06 | −4% |

TABLE 4

Weekly Feed in g

| Diet | Weeks 1 + 2 | Weeks 3 + 4 | Total |
|---|---|---|---|
| REF | 34.22 | 51.24 | 85.46 |
| Diet 3a | 35.18 | 54.86 | 90.05 |
| Diet 3b | 33.69 | 51.70 | 85.38 |
| Diet 2a | 34.75 | 54.33 | 89.09 |
| Diet 2b | 34.22 | 55.55 | 89.76 |
| Diet 1a | 34.80 | 55.34 | 90.14 |
| Diet 1b | 35.43 | 55.87 | 91.30 |

TABLE 5

Feed Conversion rate

| Diet | Weeks 1 + 2 | Weeks 3 + 4 | Total |
|---|---|---|---|
| REF | 1.23 | 1.53 | 1.39 |
| Diet 3a | 1.16 | 1.38 | 1.28 |
| Diet 3b | 1.14 | 2.02 | 1.55 |
| Diet 2a | 1.11 | 1.39 | 1.26 |
| Diet 2b | 1.07 | 2.08 | 1.53 |
| Diet 1a | 1.09 | 1.35 | 1.24 |
| Diet 1b | 1.09 | 2.28 | 1.60 |

TABLE 6

Survival

| Diet | Day 0 | Day 14 | Day 28 | |
|---|---|---|---|---|
| REF | 20 | 18.00 | 15.00 | 75.00% |
| Diet 3a | 20 | 19.33 | 15.67 | 78.33% |
| Diet 3b | 20 | 17.67 | 14.33 | 71.67% |
| Diet 2a | 20 | 18.33 | 16.33 | 81.67% |
| Diet 2b | 20 | 19.67 | 14.67 | 73.33% |
| Diet 1a | 20 | 19.00 | 16.33 | 81.67% |
| Diet 1b | 20 | 18.67 | 14.00 | 70.00% |

Feed was given daily according to an expected growth curve and average weight. It was found that Diets with MOS 1 gave better results than Diets with MOS 2 or MOS 3.

Furthermore, it was found that an inclusion rate of only 0.2 wt % of MOS in the diet provided overall better results than inclusion rates of 1 wt %. This was surprising, because it was expected that more non-yeast derived MOS would be needed to achieve similar effects to the yeast-derived MOS described for instance by Zhang et al. (2.0-4.0 g kg$^{-1}$ MOS supplementation i.e. 0.2-0.4 wt %). The MOS described by Zhang et al. inherently also comprises a considerable amount of beta-glucans, which are known to have their own beneficial effects on the intestinal health of shrimp. Hence, it was expected that more MOS according to the invention would be needed than used by Zhang et al, which surprisingly turned out not to be the case.

2. In-Vivo Growth Performance Trials 2

The second set of trials started with shrimp larvae weighing 0.8-0.9 g (born on the site of the trials) and lasted for 6 weeks.

The shrimp received either a reference diet or one of the two Diets 1a or 2a (comprising MOS 1 and 2 respectively at an inclusion rate of 0.2 wt %), but fed either daily or twice a week (the same total amount overall). 8 replicates were carried out for each diet and feeding dosage. The trial ended after 6 weeks. Otherwise, conditions were the same as in In-vivo Trials 1. The results averaged over the eight replicates are shown in tables 7-12.

TABLE 7

| | Average weight in g | | | |
|---|---|---|---|---|
| Diet | Average weight of each shrimp at start | Average weight of each shrimp at 14 days | Average weight of each shrimp at 28 days | Average weight of each shrimp at 42 days |
| REF | 0.97 | 1.86 | 4.14 | 7.59 |
| Diet 2a | 0.99 | 1.75 | 3.90 | 7.68 |
| Diet 1a | 0.98 | 1.87 | 4.38 | 7.78 |
| Diet 2a* | 0.96 | 1.86 | 4.20 | 7.74 |
| Diet 1a* | 0.98 | 1.90 | 4.34 | 7.98 |

*given twice a week instead of daily

TABLE 8

| | Weekly weight gain in g/shrimp/week | | | | |
|---|---|---|---|---|---|
| Diet | Weeks 1 + 2 | Weeks 3 + 4 | Weeks 5 + 6 | Overall weight gain | % growth |
| REF | 0.45 | 1.14 | 1.73 | 6.62 | 783% |
| Diet 2a | 0.38 | 1.08 | 1.89 | 6.69 | 773% |
| Diet 1a | 0.44 | 1.26 | 1.70 | 6.81 | 797% |
| Diet 2a* | 0.45 | 1.17 | 1.77 | 6.77 | 802% |
| Diet 1a* | 0.46 | 1.22 | 1.82 | 6.99 | 811% |

*given twice a week instead of daily

TABLE 9

| | Biomass in g | | | |
|---|---|---|---|---|
| Diet | Day 0 | Day 14 | Day 28 | Day 42 |
| REF | 19.40 | 36.45 | 80.91 | 148.29 |
| Diet 2a | 19.88 | 34.12 | 76.04 | 148.84 |
| Diet 1a | 19.52 | 37.06 | 86.45 | 153.47 |
| Diet 2a* | 19.29 | 36.06 | 80.43 | 146.07 |
| Diet 1a* | 19.68 | 37.54 | 85.17 | 155.23 |

*given twice a week instead of daily

TABLE 10

| | Weekly Feed in g | | | |
|---|---|---|---|---|
| Diet | Weeks 1 + 2 | Weeks 3 + 4 | Weeks 5 + 6 | Total |
| REF | 36.29 | 37.94 | 74.38 | 148.61 |
| Diet 2a | 36.82 | 36.31 | 70.97 | 144.10 |
| Diet 1a | 36.43 | 38.60 | 78.49 | 153.51 |
| Diet 2a* | 36.16 | 37.58 | 73.71 | 147.45 |
| Diet 1a* | 36.60 | 38.86 | 77.48 | 152.93 |

*given twice a week instead of daily

TABLE 11

| | Feed Conversion rate | | | |
|---|---|---|---|---|
| Diet | Weeks 1 + 2 | Weeks 3 + 4 | Weeks 5 + 6 | Total |
| REF | 2.13 | 0.85 | 1.10 | 1.15 |
| Diet 2a | 2.59 | 0.87 | 0.98 | 1.12 |
| Diet 1a | 2.08 | 0.78 | 1.17 | 1.15 |
| Diet 2a* | 2.16 | 0.85 | 1.12 | 1.16 |
| Diet 1a* | 2.05 | 0.82 | 1.11 | 1.13 |

*given twice a week instead of daily

TABLE 12

| | Survival | | | | |
|---|---|---|---|---|---|
| Diet | Day 0 | Day 14 | Day 28 | Day 42 | Total |
| REF | 20 | 19.50 | 19.50 | 19.50 | 97.50% |
| Diet 2a | 20 | 19.50 | 19.50 | 19.38 | 96.88% |
| Diet 1a | 20 | 19.88 | 19.75 | 19.75 | 98.75% |
| Diet 2a* | 20 | 19.38 | 19.13 | 18.88 | 94.38% |
| Diet 1a* | 20 | 19.75 | 19.63 | 19.50 | 97.50% |

*given twice a week instead of daily

It was found that Diet 1a gave better results than Diet 2a. Furthermore, it was found that feeding the diet daily rather than twice weekly also resulted in better overall performance of the shrimp.

3. In-Vivo Growth Performance Trials 3

The third set of trials started with shrimp larvae weighing 0.8-0.9 g (born on the site of the trials) and lasted for 4 weeks.

The shrimp received either a reference diet (with no immunostimulating ingredient), a diet with MOS 1 (according to the invention) at an inclusion dosage of 0.05 wt % (MOS1A) or 0.1 wt % (MOS1B), or a diet with commercially available products: Actigen (from Alltech) ("ACT"), Prebiosal ("PRE") and Active MOS (from Biorigin) ("BIO"). The inclusion rates of the commercially available products in the diets was applied as recommended by the manufacturer.

The MOS according to the invention or the commercially available products replaced wheat flour in the diet of the reference so it did not influence protein or energy content.

Feeds were produced with a pellet mill on a 2 mm die. Preconditioning with steam (>90° C.) and postconditioning (>90° C.) during 20 minutes was carried out.

The composition of the diets are shown in table 13.

TABLE 13

| Diet | REF | MOS1A 0.05 wt % | MOS1B 0.1 wt % | ACT | PRE | BIO |
|---|---|---|---|---|---|---|
| Raw Materials: | | | | | | |
| Corn gluten | 5 | 5 | 5 | 5 | 5 | 5 |
| Marine meal | 26 | 26 | 26 | 26 | 26 | 26 |
| Canola | 4 | 4 | 4 | 4 | 4 | 4 |
| Wheat + wheat flour | 40 | 39.9 | 39.95 | 39.9 | 39.8 | 39.6 |
| Soybean meal | 15 | 15 | 15 | 15 | 15 | 15 |
| Soya lecithin | 2 | 2 | 2 | 2 | 2 | 2 |
| Fish oil | 2 | 2 | 2 | 2 | 2 | 2 |
| Wheat Gluten | 4 | 4 | 4 | 4 | 4 | 4 |
| Premix (vitamins & minerals) | 2 | 2 | 2 | 2 | 2 | 2 |
| MOS1 | | 0.1 | 0.05 | | | |
| Actigen Alltech | | | | 0.1 | | |
| Prebiosal | | | | | 0.2 | |
| Biorigin Active MOS | | | | | | 0.4 |
| Total | 100.0 | 100.0 | 100.0 | 100.0 | 100.0 | 100.0 |

Each diet contained 38.2% crude protein, 6.7% lipids, 2.16% crude fibres, and 6.92% ash.

The shrimp were distributed over 20 baskets. Each net received 20 shrimp. There were 8 replicates for the REF, MOS1A and MOS1B and 4 replicates for ACT, PRE and BIO. The shrimp growth trial started with shrimp of 1 gram in average weight and lasted for 4 weeks.

All baskets were placed in 2 bigger tanks. This way, all baskets have the same water quality. Water quality in the big tanks is maintained with bioflocs. Each basket is equipped with an automatic feeder.

At start and after each week, shrimp were counted and weighed together to have average weight and total biomass.

Feed gift was adjusted daily according to an expected growth curve and average weight from initial and last measurement.

The results are shown in tables 14-15 below.

TABLE 14

| | Average weight in g/shrimp | | | | |
|---|---|---|---|---|---|
| Average | Day 0 | Day 7 | Day 14 | Day 21 | Day 28 |
| REF | 0.967 | 1.605 | 2.553 | 3.542 | 4.620 |
| MOS1A | 0.978 | 1.546 | 2.445 | 3.504 | 4.648 |
| MOS1B | 0.980 | 1.605 | 2.528 | 3.555 | 4.704 |
| ACT | 0.980 | 1.571 | 2.465 | 3.520 | 4.557 |
| PRE | 0.977 | 1.591 | 2.470 | 3.522 | 4.592 |
| BIO | 0.978 | 1.645 | 2.488 | 3.570 | 4.680 |

TABLE 15

| | Weekly growth | | | | |
|---|---|---|---|---|---|
| | Week 1 | Week 2 | Week 3 | Week 4 | Total 4 weeks |
| REF | 0.639 | 0.948 | 0.989 | 1.078 | 3.653 |
| MOS1A | 0.568 | 0.899 | 1.060 | 1.144 | 3.670 |
| MOS1B | 0.625 | 0.923 | 1.028 | 1.149 | 3.724 |
| ACT | 0.591 | 0.894 | 1.055 | 1.037 | 3.577 |
| PRE | 0.614 | 0.879 | 1.053 | 1.070 | 3.615 |
| BIO | 0.667 | 0.842 | 1.082 | 1.111 | 3.702 |

The invention claimed is:

1. A method for feeding crustaceans, the method comprising feeding crustaceans a mannose oligosaccharide composition, wherein the composition has a solubility in water of 50% or more;

comprises less than 0.1 wt % beta-glucan on a dry weight basis (db);

comprises at least 50 wt % of mannose oligosaccharides having a degree of polymerization of 3 or more on a dry weight basis (db); and is obtained by polycondensation of mannose in a microreactor, wherein the pressure in the microreactor is from 0.5 bar to 30 bar.

2. The method according to claim 1 wherein the mannose oligosaccharide composition is not obtained from yeast or vegetable fibres.

3. The method according to claim 1 wherein the pressure in the microreactor is from 2.5 to 5.0 bar.

4. The method according to claim 3, wherein the polycondensation of mannose in the microreactor takes place at a temperature of 140 to 300° C. and wherein the residence time of the mannose in the microreactor is from 1 to 600 seconds.

5. The method according to claim 1 wherein the mannose oligosaccharide composition comprises at least 50% $\alpha,\beta$-(1, 6) linkages and $\alpha,\beta$-(1,3) linkages.

6. The method according to claim 1 wherein the mannose oligosaccharide composition is in a liquid form, powder form, or supported on a solid carrier.

7. The method according to claim 1 wherein the crustaceans are fed daily or every 2, 3, 4 or 5 days with the mannose oligosaccharide composition or with a feed composition comprising the mannose oligosaccharide composition.

8. The method according to claim 1 wherein the crustaceans are selected from one or more crustaceans of the suborders Dendrobranchiata and Pleocyemata.

9. The method according to claim 8 wherein the crustaceans are shrimp of the species *Litopenaeus vannamei* or *Penaeus monodon.*

10. The method according to claim 1 wherein the amount of the mannose oligosaccharide composition in a feed composition is from 0.01 to 0.9 wt % of the feed composition, on a dry weight basis.

11. The method according to claim 1 wherein feeding the crustaceans the mannose oligosaccharide composition results in one or more of:

decrease of the food conversion ratio;

decrease of the mortality rate of the crustaceans;

increase of the growth performance of the crustaceans;

increase of the growth of the crustaceans' intestinal microvilli, midgut epithelium and brushborder height, as measured by histology; and increase of gut integrity;

as compared to when feeding the crustaceans a diet without any mannose oligosaccharide composition; or a diet with a mannose oligosaccharide composition having a mannose oligosaccharide content with a degree of polymerization of 3 or more of less than 50 wt % at the same inclusion rate in the diet; or a diet with a mannose oligosaccharide composition having a beta-glucan content greater than 0.1 wt % on a dry weight basis at the same inclusion rate in the diet.

12. A method for prophylactic treatment of crustaceans to prevent or reduce the severity of bacterial infections, the method comprising feeding the crustaceans according to the method of claim 1.

13. The method according to claim 1 wherein the pressure in the microreactor is from 1.6 to 3.0 bar.

* * * * *